United States Patent
Englander et al.

(10) Patent No.: US 8,718,877 B1
(45) Date of Patent: May 6, 2014

(54) MULTI-FUNCTION VEHICLE MIRROR CONTROL AND METHODS OF USE

(75) Inventors: Benjamin Englander, Woodmere, NY (US); Julian Serer, Plainview, NY (US)

(73) Assignee: Rosco, Inc., Jamaica, NY (US)

( * ) Notice: Subject to any disclaimer, the term of this patent is extended or adjusted under 35 U.S.C. 154(b) by 131 days.

(21) Appl. No.: 13/286,647

(22) Filed: Nov. 1, 2011

Related U.S. Application Data

(60) Provisional application No. 61/408,982, filed on Nov. 1, 2010.

(51) Int. Cl.
| | | |
|---|---|---|
| *B60R 22/00* | (2006.01) | |
| *E05F 15/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *G02B 5/08* | (2006.01) | |
| *G02B 7/182* | (2006.01) | |

(52) U.S. Cl.
USPC .............................. 701/49; 359/865; 359/872

(58) Field of Classification Search
USPC ................. 359/512, 878, 841, 843, 871–877; 307/10.1, 125, 9.1–10.8; 200/50.1, 200/50.32–50.37, 5 R, 6 A, 17 R, 18; 701/36, 701/49
See application file for complete search history.

(56) References Cited

U.S. PATENT DOCUMENTS

| | | | | |
|---|---|---|---|---|
| 4,871,953 A | * | 10/1989 | Anstee | 318/466 |
| 6,059,419 A | | 5/2000 | Englander et al. | |
| 6,554,436 B1 | * | 4/2003 | Lang et al. | 359/841 |
| 7,455,413 B2 | * | 11/2008 | Englander | 359/841 |
| 7,798,659 B2 | | 9/2010 | Englander | |
| 2003/0083969 A1 | * | 5/2003 | Uchiyama et al. | 705/35 |
| 2006/0082910 A1 | * | 4/2006 | Danek et al. | 359/877 |
| 2007/0095633 A1 | * | 5/2007 | Sakai | 200/1 R |
| 2009/0073590 A1 | | 3/2009 | Englander et al. | |
| 2010/0007961 A1 | * | 1/2010 | Kukita et al. | 359/605 |
| 2010/0079883 A1 | | 4/2010 | Englander | |
| 2011/0286096 A1 | * | 11/2011 | Dykhouse | 359/512 |

FOREIGN PATENT DOCUMENTS

| | | | |
|---|---|---|---|
| JP | 11096853 A | * | 4/1999 |
| WO | WO 2007034853 A1 | * | 3/2007 |

OTHER PUBLICATIONS

"Install" 2000, Houghton Miffin Company, American Heritage Dictionary of the English Language. Accessed at http://www.thefreedictionary.com/install on Jun. 6, 2013.*

* cited by examiner

*Primary Examiner* — Stephone B Allen
*Assistant Examiner* — Kimberly N Kakalec
(74) *Attorney, Agent, or Firm* — Stroock & Stroock & Lavan LLP

(57) ABSTRACT

A multi-function vehicle mirror control system includes at least one mirror assembly having at least one first mirror and at least one second mirror. Each of the mirrors have one or more motors to tilt and/or pan the mirror, and/or at least one heating element. The system also includes a control input device having a plurality of selectable controls to select the mirror assembly, the first mirror, the second mirror, and/or the heating element. In some embodiments, the controller controls selection, activation, and/or movement of the mirror assembly, the first mirror and/or the second mirror. In some embodiments, the system includes an orientation switch used to determine a selection orientation of the multi-function vehicle mirror control system. Additional alternative embodiments are also disclosed.

30 Claims, 5 Drawing Sheets

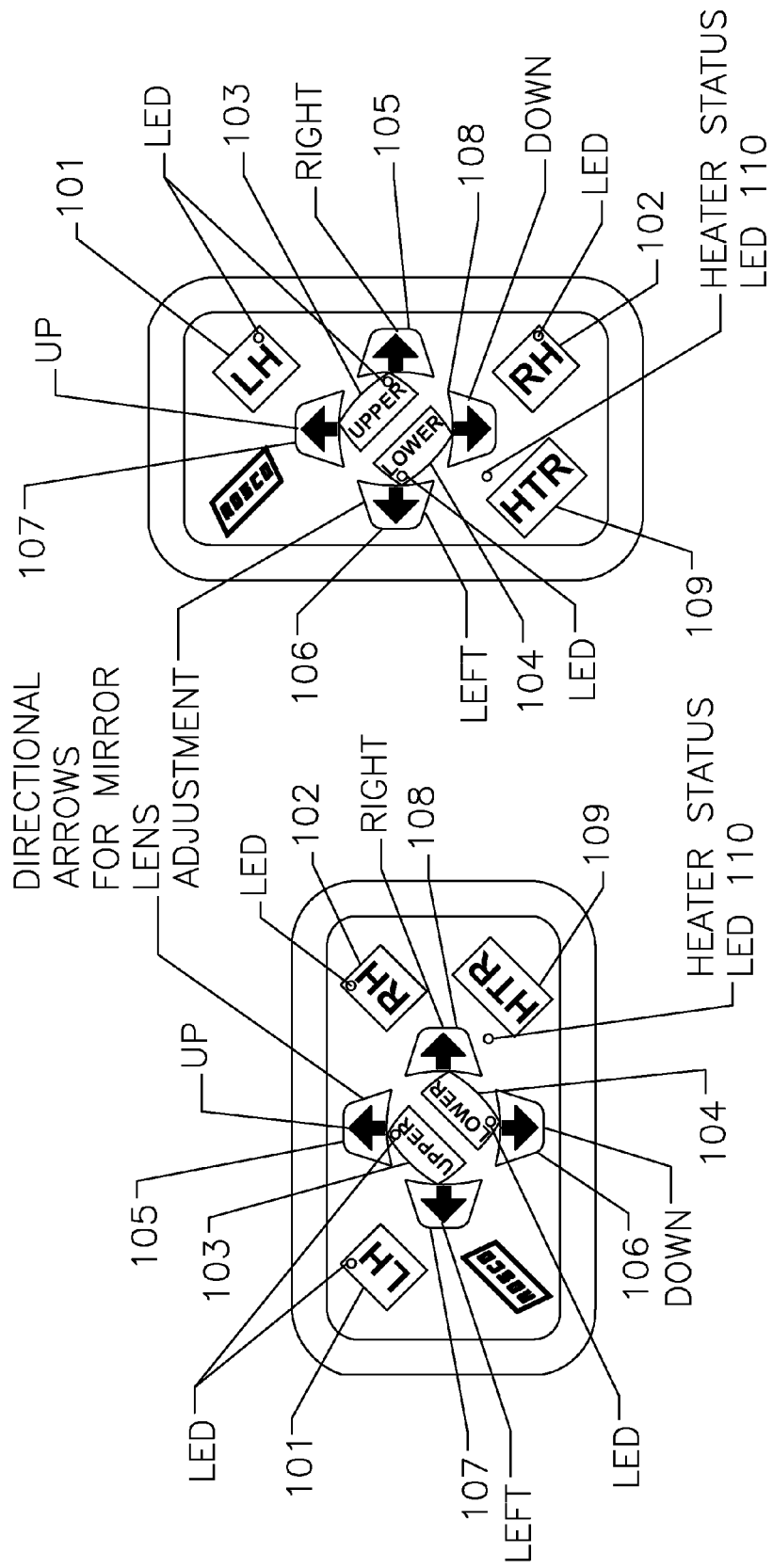

MULTI-FUNCTION VEHICLE MIRROR CONTROL AND METHODS OF USE

RELATED APPLICATION

This application claims priority to U.S. Provisional Application No. 61/408,982, filed on Nov. 1, 2010, entitled: Multi-Function Vehicle Mirror Control and Methods of Use, and which is hereby incorporated by reference in its entirety.

BACKGROUND OF THE INVENTION

Field of the Invention

The present invention generally relates to a vehicle mirror control system for controlling multiple mirrors and/or multiple/related functions, and/or methods of use and/or installing same.

SUMMARY OF THE INVENTION

Various embodiments of multi-function vehicle mirror control systems are provided. In addition, various alternative methods of operating installing and operating multi-function vehicle mirror control systems are also provided.

In some embodiments, a multi-function vehicle mirror control system includes at least one mirror assembly having at least one first mirror and at least one second mirror, each mirror having one or more motors to tilt and/or pan the mirror, and/or at least one heating element located within the at least one mirror assembly to heat the at least one first and second mirrors. In addition, the system includes at least one control input device having a plurality of selectable controls to select the at least one mirror assembly, the at least one first mirror, the at least one second mirror, and/or the at least one heating element. In some embodiments, the at least one control input device also has one or more directional input control to select one or more directions of movement of a selected mirror. Furthermore, in some embodiments of the system, the at least one controller is operatively enabled to control selection, activation, and/or movement of the at least one mirror assembly, the at least one first mirror and/or the at least one second mirror. In addition or alternatively, in some embodiments, the at least one controller is operatively enabled to control activation and/or deactivation of the at least one heating element. Furthermore, in some embodiments, selection of a control of the control input device provides selection, activation, and/or movement information to the at least one controller, and the at least one controller controls and operates the corresponding at least one mirror assembly, the at least one first mirror, the at least one second mirror, and/or the at least one heating element responsive to the information.

In some further embodiments of the system, selection of one of the at least one first and second mirrors must be proceeded sequentially by selection, within a predefined period of time, of the at least one mirror assembly and/or another of the at least one first and second mirrors.

In some further embodiments of the system, the one or more directional input control transmits a directional input signal to the at least one controller, and the at least one controller controls movement of a selected mirror in a single direction responsive to the directional input signal. In some further embodiments of the system, the one or more directional input control transmits a directional input signal to the at least one controller, and the at least one controller controls movement of a selected mirror in multiple possible directions responsive to the directional input signal.

In some embodiments, the system further comprising at least one cutoff timer operatively connected to the at least one controller, and the at least one controller activates the at least one cutoff timer responsive to selection of the at least one mirror assembly which allows selection of the at least one first mirror and/or the at least one second mirror during a predefined period. In addition, in some embodiments, the at least one controller resets the cutoff timer responsive to the selection of one of the at least one first mirror and/or the at least one second mirror, which then allows selection of the one or more directional input control during the predefined period.

In some embodiments, the system further comprises a backlight and/or an LED, and the at least one controller activates the backlight and/or LED for a predefined period of time responsive to the selection of a control of the control input device.

In some embodiments, the system further comprises at least one automatic heater cutoff timer, wherein the at least one controller activates the at least one automatic heater cutoff timer responsive to selection of the control to activate the at least one heating element, which deactivates the at least one heating element after a predefined period of time. In some embodiments of the system, the at least one controller can further deactivate the at least one heating element prematurely responsive to reselecting the control for the at least one heating element before the predefined period of time has lapsed.

In some embodiments, a method of operating a multi-function vehicle mirror control system includes determining a selection orientation of the multi-function vehicle mirror control system, and selecting one of a plurality of controls including a mirror assembly control, a first mirror control, a second mirror control, and/or a heating element control. In addition, the method includes selecting a direction of movement when one of the first and second mirrors are selected, and controlling selection, activation and movement of the mirror assembly, the first mirror and the second mirror. In some embodiments, the method controls activation and deactivation of the heating element responsive to the selecting of the one of plurality of controls, the selecting the direction and the determining the selection orientation.

In some embodiments, the determining further comprises automatically determining the selection orientation responsive to an automatic orientation detection device. In some embodiments, the determining further comprises determining the selection orientation responsive to activation of an orientation switch. In some embodiments, the method further comprises transmitting the direction of movement to at least one controller, and controlling by the at least one controller movement of a selected mirror in a single direction responsive to the direction of movement. In some embodiments, the method further comprising transmitting the direction of movement to at least one controller, and controlling by the at least one controller movement of a selected mirror multiple directions responsive to the directional of movement.

In some embodiments, the method further comprises activating by at least one controller a cutoff timer responsive to selection of the at least one mirror assembly which allows selection of at least one of the at least one first mirror and the at least one second mirror during a predefined period. In some embodiments, the method further comprises resetting by the at least one controller the cutoff timer responsive to the selection of one of the at least one first mirror and the at least one second mirror, which then allows selection of the at least one directional input control during the predefined period.

In some embodiments, the method further comprises a backlight and/or an LED, and wherein the at least one controller activates the backlight and/or LED for a predefined period of time responsive to the selection of a control of the control input device.

In some embodiments, the method further comprises activating by at least one controller an automatic heater cutoff timer responsive to selection of the control to activate the at least one heating element, which deactivates the at least one heating element after a predefined period of time. In some embodiments, the method further comprises deactivating by the at least one controller the at least one heating element prematurely responsive to reselecting the control for the at least one heating element before the predefined period of time has lapsed.

In some embodiments, a method of operating a multi-function vehicle mirror control system includes selecting one of a plurality of controls including a mirror assembly control, a first mirror control, a second mirror control, and/or a heating element control. In addition the method includes selecting a direction of movement when one of the first and second mirrors are selected, and controlling selection, activation and movement of the mirror assembly, the first mirror and the second mirror, and controlling activation and deactivation of the heating element responsive to said selecting of the one of plurality of controls and said selecting the direction. In some embodiments, the method further includes determining whether one of the first and second mirrors and the mirror assembly has been selected within a predefined period of time. In some embodiments, the method controls selection, activation and movement of one of the first and second mirrors when said determining determines that the one of the first and second mirrors and the mirror assembly has been selected within the predefined period of time before the selection of the at least one mirror assembly and another of the at least one first and second mirrors.

BRIEF DESCRIPTION OF THE DRAWINGS

FIG. 1A is a landscape orientation view of a first exemplary embodiment of the multi-function vehicle mirror control according to some embodiments of the invention;

FIG. 1B is a portrait orientation view of a first exemplary embodiment of the multi-function vehicle mirror control according to some embodiments of the invention;

DETAILED DESCRIPTION OF THE INVENTION

Figure 2B:
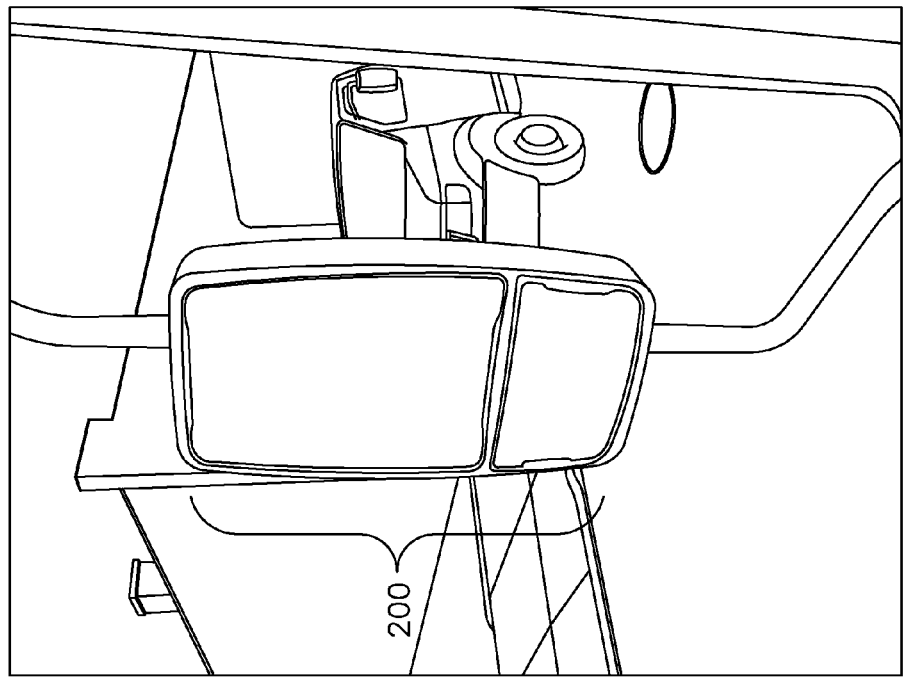
FIG. 2B is a view of a vehicle mounted mirror assembly with dual motorized mirrors as could be controlled by the multi-function vehicle mirror control according to some embodiments of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Various embodiments of the multi-function vehicle mirror control are provided. In addition, various alternative methods of installing the multi-function vehicle mirror control are also provided.

A multi-function control for a vehicle mirror and methods of use are provided. In particular, a multi-function control for a vehicle mirror that may be used in multiple orientations and provides for control of multiple vehicle mirrors, and methods of using the multi-function control, are provided.

As can be seen in FIGS. 1A-B, a first exemplary embodiment of a multi-function control 100 for a vehicle mirror assembly (such as exemplary mirror assembly 200, FIGS. 2A-2B) is shown in portrait and landscape orientations. As shown in FIGS. 1A-1B, the multi-function control 100 may be, for example, a membrane switch. The use of a membrane switch is merely illustrative, and any other suitable control may be used in accordance with the disclosed subject matter. For example, in some embodiments of the disclosed subject matter, the multi-function control 100 may be a touch screen display interface or standard push buttons.

As shown in FIG. 1A, the multi-function control 100 may be oriented in a landscape orientation. As shown in FIG. 1B, the multi-function control 100 may be oriented in a portrait orientation. The multi-function control 100 may be installed in a vehicle (such as the exemplary vehicle 300 in FIG. 3) in either orientation. In some embodiments, multi-function control 100 can be optionally oriented in either direction and include an orientation switch integrated therein and/or a switch for manual activation.

The multi-function control 100 of the disclosed subject matter has a compact design. The multi-function control 100 allows for control of a plurality of mirror functions for a plurality of vehicle mirrors from a single interface. For example, the multi-function control 100 may allow for control of all mirror functions for all external mirrors on vehicle 300, such that a user can advantageously control all mirror functions of multiple mirrors from a single interface. In some embodiments, this may include control of multiple motorized mirrors mounted in a single mirror assembly (for example, as in mirror assembly 200) or housing, or multiple assemblies or housings, all from a single interface. Additionally, in some embodiments this may include control of multiple mirrors mounted in multiple locations along the external of a vehicle. For example, in the case of a school bus, the multi-function control 100 might be adapted to control movement of both side view mirrors and/or cross view mirrors (mirrors for viewing children crossing in front of a bus) mounted on both the left and right side of the vehicle.

The plurality of functions that are controlled by the multi-function control 100 may include, for example, a heater function, movement of a mirror lens, control of vehicle cameras (such as, for example, camera 205 shown in FIG. 2A), control of mirror and vehicle lighting, motorized folding/unfolding of the mirror assembly 200, control of sensors, and/or any other suitable function. In one example, when a vehicle mirror is used to provide alerts to others, such as pedestrians, the multi-function control 100 may provide a user with the ability to activate lights on the vehicle mirror that alert pedestrians as to whether it is safe to cross. In another example, the multi-function control 100 may provide a user with the ability to turn on and off a light within a vehicle mirror or disposed on the vehicle mirror assembly 200 and/or the body of the vehicle 300.

In some embodiments, the multi-function control 100 may be configured with controls as shown, for example, in the layout in FIGS. 1A-1B. Multi-function control 100 comprises left-hand ("LH") control 101 and right-hand ("RH") control 102 for selecting a side of the vehicle 300 where control of mirrors is desired. Multi-function control 100 further includes upper control 103 and lower control 104 for selecting an upper or lower mirror on a particular side of vehicle 300. It is to be understood that these designations are merely exemplary, and other designations and configurations are also contemplated. For example, rather than, or in addition to, upper and lower mirrors, multi-function control 100 may be configured to control mirrors located in front and rear of vehicle 300, or any other configuration.

Multi-function control 100 further comprises, for example, directional controls 105, 106, 107 and 108, as well as heater control 109. It is important to note that, depending on the orientation of installation, in different embodiments the directional controls will control movement of a selected mirror in different directions. For example, when multi-function control 100 is installed in a landscape orientation, as depicted in the embodiment of FIG. 1A, directional controls 105 and 106 control tilting of a selected mirror up and down respectively, while directional controls 107 and 108 control panning of a selected mirror left and right respectively. Conversely, when multi-function control 100 is installed in a portrait orientation, as depicted in the embodiment of FIG. 1B, directional controls 105 and 106 control panning of a selected mirror right and left respectively, while directional controls 107 and 108 control tilting of a selected mirror up and down respectively.

It is again to be understood that the configuration and types of controls as shown in FIGS. 1A-B are purely exemplary in nature, and other configurations and control types are also contemplated. For example, other directional controls and/or the number of directional controls are contemplated such as a single multi-directional control (e.g. a joystick, touch screen, multi-tilt button etc.), switches, scroll wheels, knobs or any other suitable control. Additionally, the shape of multi-function control 100 is also merely exemplary. In some embodiments, the shape of multi-function control 100 may be symmetrical (e.g. square, diamond, or circular etc.) so as not to require multiple orientations for different installations. In some embodiments, the multi function control is used to control mirrors and is not used to control any heaters. In some embodiments, the multi function control will be dedicated or only work for a particular side of the vehicle, and therefore, the left-right switch to indicate the side of the vehicle is not necessary.

In some embodiments, the directional arrow logic of multi-function control 100 may be adjusted using, for example, software, firmware, an accelerometer or other position detection sensor, key, an on-board switch, or in any other suitable way, such that the up/down and left/right adjustments of the control remain unchanged regardless of the orientation of the control. In some embodiments, instead of manual actuators, electronic actuators and/or switches can be used in combination and/or as an alternative. A user may install multi-function control 100 in any desired orientation. In alternative embodiments, a user may adjust the orientation of multi-function control 100 before or after installation of the control. For example, the multi-function control may have an internal toggle, switch, key, knob, button or sensor that can be used to set the orientation prior to installation, and which is inaccessible after installation to prevent accidental reorientation of multi-function control 100. Conversely, in other embodiments such a mechanism can be positioned so as to be accessible and operable even after installation. Such an embodiment would be advantageous should multi-function control 100 be installed in a location in the vehicle that can cause the orientation of the multi-function control 100 to change, such as in, for example, a swivel arm of a vehicle seat, or a vehicle door (which changes the orientation of multi-function control 100 based on whether the door is open or closed).

Figure 4:
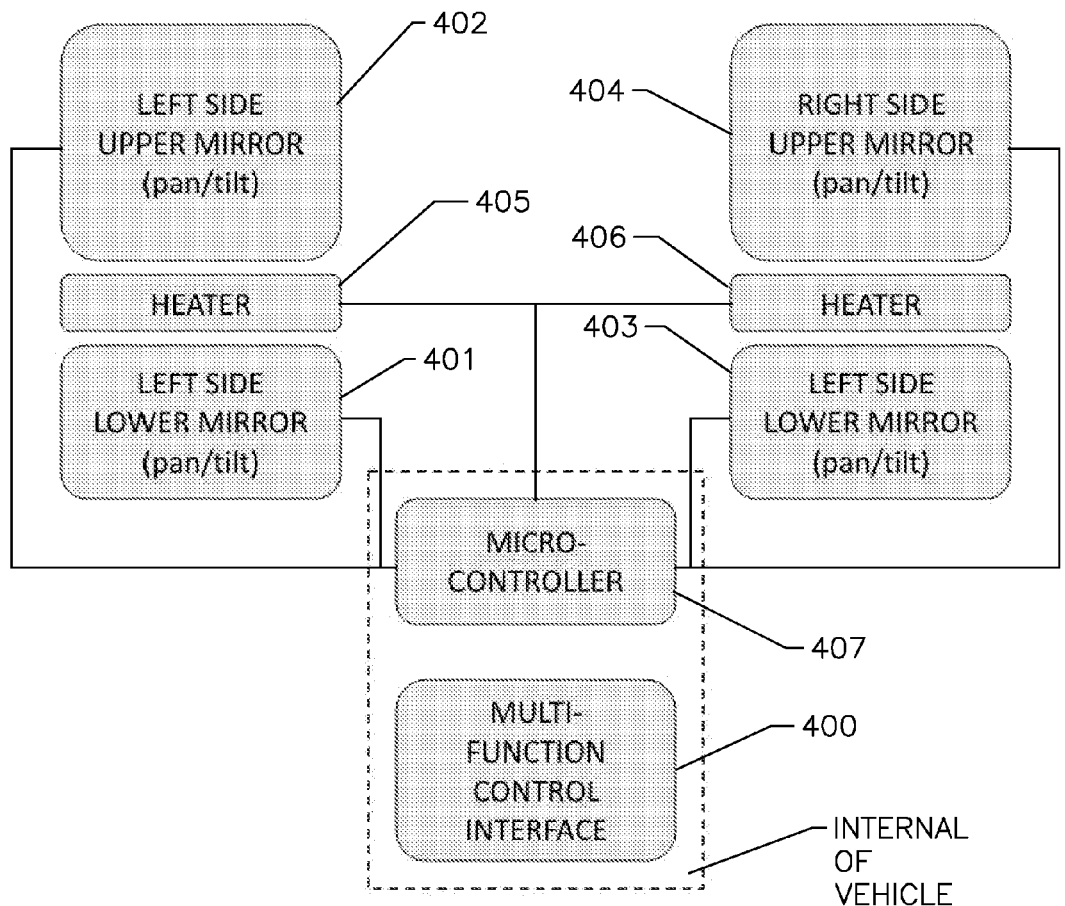
FIG. 4 is a block diagram of the multi-function vehicle mirror control arrangement according to some embodiments of the invention.

As shown in FIG. 1A-B, heater control 109 is a single push-on/push-off control. In different embodiments, heater control 109 may include a separate control for on and off functions. Furthermore, in different embodiments, heater control 109 may include two separate controls for activating and deactivating heating elements 405 and 406 (as seen in FIG. 4), one for each mirror assembly. In some embodiments, each mirror lens has its own heater and one or more heater control switches controls all four heaters as one or individually. In some embodiments, the heater control switch can also control more heaters, for example, as in the case of a school bus, where there are cross view mirrors for each bus, and both cross view mirrors are also heated. In some embodiments, one heater control switch will control all heaters for each mirror and/or cross view mirror. In other embodiments, separate heater control switches can be provided for each side of the bus and/or each heater used for each mirror.

Multi-function control 100 may be optionally illuminated for low light conditions. Multi-function control 100 may allow a user to switch between controlling left-hand and right-hand mirror heads (e.g., driver's side and passenger side mirror heads). An indicator may be provided (e.g., an LED indicator) to show the active mirror head. For example, when LH control 101 is pressed and is active, an indicator may show that LH control 101 has been pressed, and the controls will operate the left mirrors. When RH control 102 is pressed and is active, an indicator may show that RH control 102 has been pressed, and the controls will operate the right mirrors. When upper button 103 is pressed and is active, an indicator may show that upper button 103 has been pressed, and the controls will operate an upper mirror of the side that is active. When lower button 104 is pressed and is active, an indicator may show that lower button 104 has been pressed, and the controls will operate a lower mirror of the side that is active. In some embodiments, when neither of the right-hand and left-hand controls 101, 102 have been activated, one must be pressed to be able to activate either of the upper and lower controls 103, 104.

An indicator (e.g., an LED indicator) may be provided to indicate a status of the mirror heater. The mirror heater may turn off after a specified time limit. Multi-function control 100 may have a waterproof construction due to a lack of moving parts in, for example, a membrane switch or touch-screen display interface.

Figure 2A:
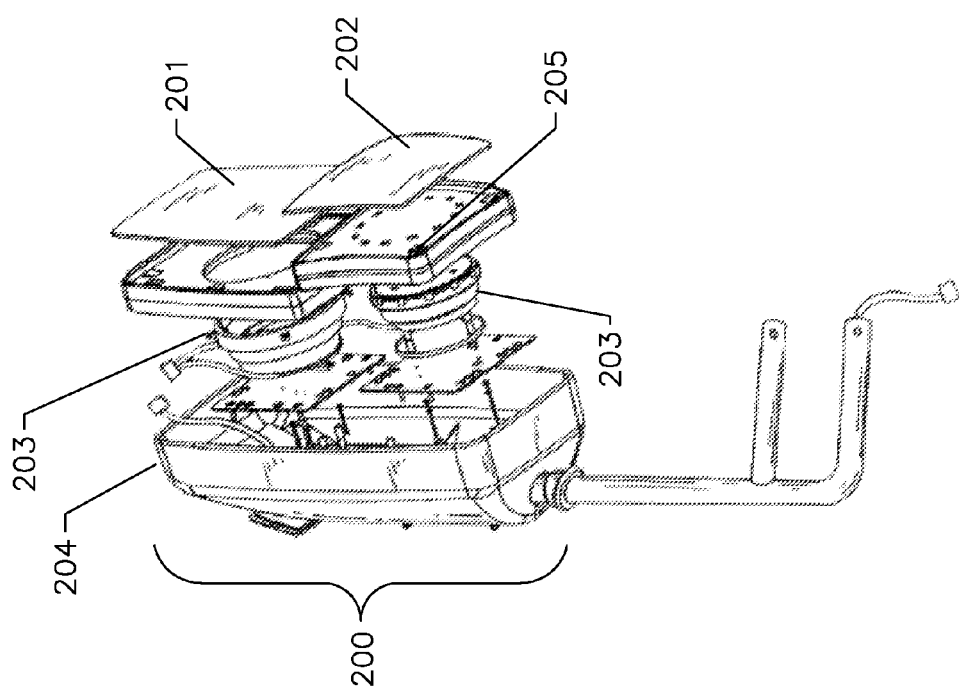
FIG. 2A is an exploded view of a mirror assembly with dual motorized mirrors as could be controlled by the multi-function vehicle mirror control according to some embodiments of the invention.

As can be seen in FIGS. 2A and 2B, in some embodiments multi-function control 100 may provide a user with the ability to control the movement of mirror lenses, including movement of a flat mirror lens 201 (e.g., up, down, left, right) and movement of a convex mirror lens 202 (e.g., up, down, left, right). In some embodiments, and as can be seen in FIG. 4, four separate mirrors (i.e., a left hand convex lens 401, a left flat lens 402, a right convex lens 403, and a right flat lens 404) may be controlled from multi-function control 100. These mirror functions and lenses are merely illustrative, and any other suitable mirror functions and/or lenses may be controlled using multi-function control 100 of the disclosed subject matter.

In some embodiments, mirrors lenses 201 and 202 may be adjusted by mounting each mirror with a dual motor configuration, such as motor configuration 203, one motor providing tilt and one motor providing panning. Alternatively, a single multidirectional motor or any number of motors may optionally be used. Additionally, flat mirror lens 201 and convex mirror lens 202 may be mounted or enclosed within a single mirror assembly or housing, as shown for example in FIGS. 2A-B in mirror housing 204. In other embodiments, depending on the configuration and location of mirror lenses 201 and 202, each mirror may be mounted or enclosed in separate assemblies or housings and/or different types and/or shapes of mirrors may be used. Additional details of the rear-view mirror illustrated in FIG. 2A and other alternative mirrors/embodiments may be found in co-pending U.S. patent application Ser. No. 12/567,900, U.S. patent application Ser. No. 12/238,990 and/or U.S. patent application Ser. No. 11/692,444 now U.S. Pat. No. 7,798,659, and/or U.S. Pat. No. 6,059,419, which are all hereby incorporated herein by reference in their entirety. In alternative embodiments, a camera may also be positioned in the upper and/or lower mirror carrier plate(s) as described in co-pending U.S. patent application Ser. No. 12/567,900, which is hereby incorporated herein by reference in its entirety.

Figure 3:
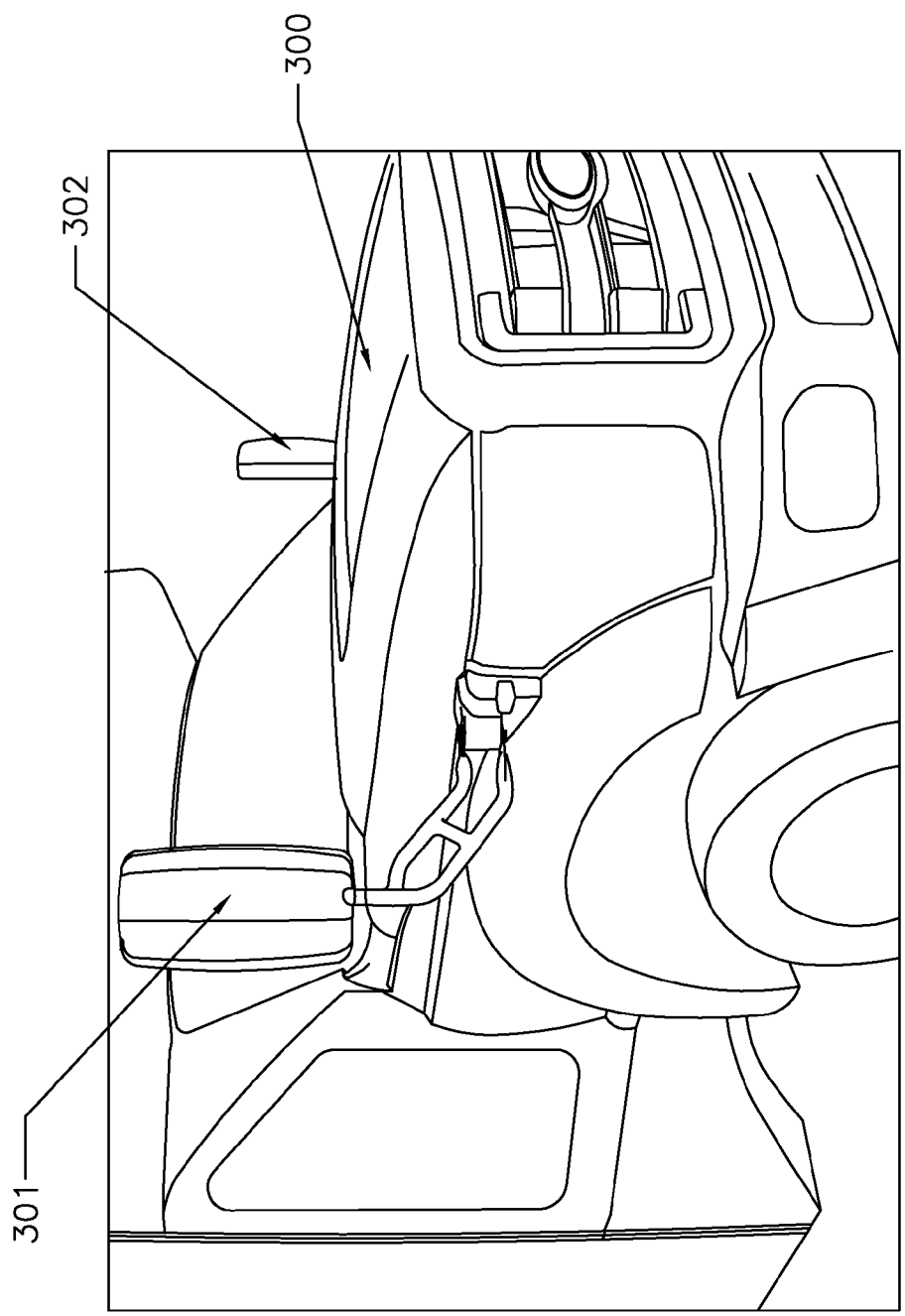
FIG. 3 is a view of a vehicle with two mounted mirror assemblies in which the multi-function vehicle mirror control would be installed according to some embodiments of the invention.

As described earlier, multi-function control 100 can be configured to control mirrors mounted in variety of locations on vehicle 300. For example, in some embodiments multi-function control 100 can be configured to control multiple mirrors in multiple mirror assemblies, such as mirror assemblies 301 and 302, which, in the exemplary embodiment of FIG. 3, are mounted to fender mounts located above the vehicle wheel base. In alternative embodiments, the mirrors may be housed in separate assemblies, for example on the same side of the vehicle and/or different locations on the vehicle.

FIG. 4 is a block diagram of the multi-function vehicle mirror control arrangement according to some embodiments of the invention. Multi-function control 400 receives an input from a user, and the input is relayed to micro-controller 407 or other suitable controller and/or switching mechanism. Left hand convex lens 401, left flat lens 402, right convex lens 403, and right flat lens 404 are actuated responsive to signals transmitted to their relevant motors from micro-controller 407 located internal of the vehicle. In some embodiments micro-controller 407 may be any standard micro-controller, such as an Atmel ATmega 48 8-bit AVR micro-controller, or any other commercially available controller. Additionally, each mirror may be configured with a motor controller module (not shown), such as an Atmel T6817 dual triple DMOS output driver for control of the motors (also not shown), or any other commercially available motor controller module.

In addition to mirror control, when multi-function control 400 receives an input for a user to activate heaters 405 and 406, the input is relayed to micro-controller 407, which activates heaters 405 and 406. It should be noted that the wiring design and controls of the embodiment of FIG. 4 are merely exemplary, and any other appropriate design and controls are also contemplated. For example, while heaters 405 and 406 are shown in FIG. 4 as being wired together and controlled by a single control, multiple wires and/or controls may also be used. Similarly, all mirror wiring and controls shown are merely exemplary.

Figure 5:
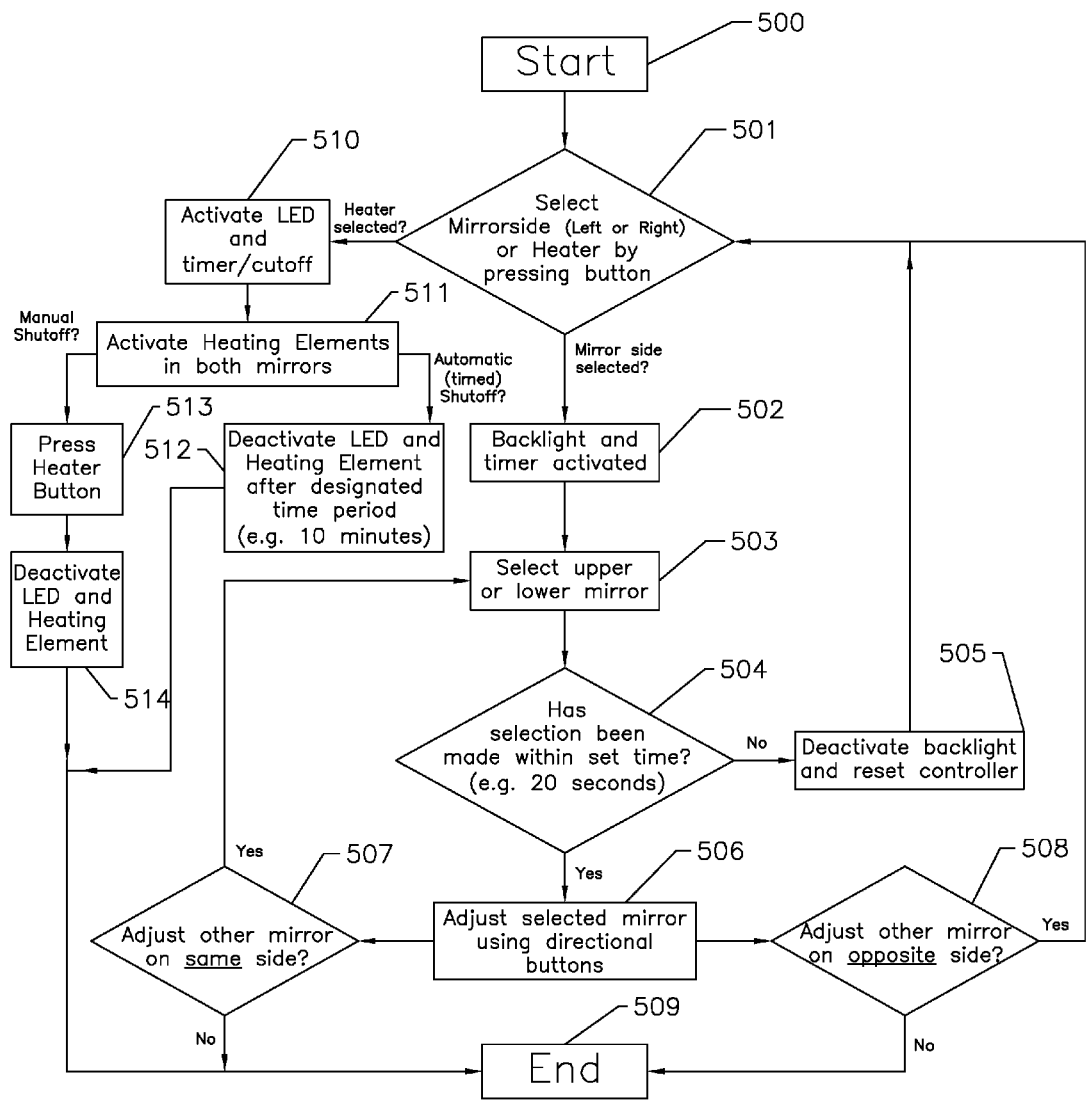
FIG. 5 is a flow diagram of operation of the multi-function vehicle mirror control according to some embodiments of the invention.

FIG. 5 is a flow diagram of the operation of the multi-function vehicle mirror control according to some embodiments of the invention. It should again be noted that while the embodiment of the flow diagram of FIG. 5 outlines a system comprising elements of FIGS. 1A-B and FIG. 4, these designations are merely exemplary. In addition, the number and/or types of systems to be controlled by the multi-function control may also be varied. Operation of multi-function control 100 begins at Start 500, when a user desires to operate at least one of a mirror function and/or a heating function. Selection, for example, of either a mirror side (left or right) or the heater function is made by activating a representative designated control ("LH", "RH" or "Heater") at step 501. If a mirror side is activated at step 501, a backlight for multi-function control 100 and an associated cut-off timer are activated at step 502.

Next, selection of either an upper mirror or a lower mirror is made by activating a representative designated control ("Upper or "Lower") at step 503. Regardless of which mirror has been selected in step 503, determination is made as to whether selection of and upper or lower mirror was made within a predetermined period of time (e.g. 20 seconds) at step 504. If selection of an upper or lower mirror has not be made within the predetermined period of time, deactivation of the backlight and resetting of the controller system commences at step 505, at which point reselection of a mirror side or heating function (step 501) would be required in order to continue. If it is determined that selection of an upper or lower mirror has been made within the predetermined period of time, then the cut-off timer is reset and adjustment of the selected mirror may be made using directional controls 105, 106, 107 and/or 108 at step 506.

Once the selected mirror has been adjusted as desired at step 506, adjustment of the other mirror of the same side of the vehicle, and/or of an upper or lower mirror of the opposite side of the vehicle, may also be desired. Should adjustment of the other mirror of the same side of the vehicle be desired at step 507, selection of the other mirror may be made at this time by returning to step 503. For example, if the upper left hand mirror was selected and adjusted in steps 501 to 506 (and particularly, for example, at step 503), selection of the lower left hand mirror may now be made by activating the representative designated control ("Lower") at step 503, and continuing with the operation. Alternatively, should adjustment of an upper or lower mirror of the opposite side of the vehicle be desired at step 508, selection of the opposite side of the vehicle must first take place at step 501, and continue with the operation. Continuing the example above, activation of the representative designated control ("RH") would be required at step 501 in order to continue. If no further mirror adjustment is desired at step 507 or 508, time eventually lapses, the cut-off timer resets the controller, and the operation terminates at end step 509.

At any point during the operation of the multi-function vehicle mirror control according to some embodiments of the invention, and particularly, for example, at step 501, activation of the heater function may be desired. Selection of the heater function is made by activating a representative designated control ("Heater") at step 501. If the heater function is activated at step 501, an LED (such as Heater Status LED 110 of FIGS. 1A-B) and an associated cut-off timer are activated at step 510. Heating elements (such as, for example, heating elements 405 and 406 of FIG. 4) are activated in both mirror assemblies at step 511.

After a predetermined period of time (e.g. 10 minutes), the cut-off timer causes deactivation of the LED and the heating elements of both mirrors occurs automatically at step 512, provided there is no manual intervention prior to termination of the predetermined period of time. Alternatively, reselection of the representative designated control ("Heater") may be made at step 513 prior to automatic deactivation at step 512, which manually causes deactivation of the LED and heating elements at step 514. In either situation, operation terminates at end step 509.

In some embodiments of the multi-function vehicle mirror control, additional steps and/or methods of setting and/or determining the orientation of multi-function control 100 are also contemplated. For example, in some embodiments, multi-function control 100 can be optionally oriented in any direction and includes an automatic orientation switch integrated therein and/or a switch for manual activation for a particular orientation. In some embodiments, once an orientation of multi-function control 100 is set, for example during installation and/or during use of the control, the orientation setting remains fixed until it is reset, for example, using a reset button, reset software, reset timer, or any other suitable means that resets the orientation memory. In some embodiments, orientation of multi-function control 100 may be dynamically re-oriented in real time by an automatic orientation switch such as a standard movement sensor, standard level sensor or other standard sensor device that can provide real-time feedback of the orientation of multi-function control 100. The orientation switch will then detect the orientation automatically when multi-function control 100 is installed, for example, in a moveable surface that may change the physical orientation of the control relative to its previous orientation. Such an embodiment may optionally include an override switch to lock the control in a set directional control orientation regardless of physical orientation.

In some embodiments, a method of installing multi-function control 100 includes, for example, disposing the multi-function control in a location for mounting in a vehicle, wherein position and/or orientation of the multi-function control can be detected by an orientation mechanism disposed therein. Once detected, the orientation can be set for use. In some embodiments, the method may further include completing mounting the multi-function control with the orientation set using a standard mount bracket and/or any other mounting. In addition, in some embodiments, prior to completing mounting, a user can test the multi-function control to ensure that the multi-function control has been set correctly in the desired orientation such that the individual controls operate in the correct direction and/or activation.

It is of course to be understood that any given steps recited in any methods and/or operations described herein can be sequential, non-sequential and/or sequence independent steps. For example, in any contemplated method of operating the multi-function mirror control, the step of selecting an upper or lower mirror might be performed prior to selecting a left or right side of the vehicle. Additionally, a step or setting may be performed prior to installation of the multi-function control and associated system, or during used of the installed control. For example, timer settings for any cut-off timers may be predetermined prior to installation. Alternatively, a control for adjusting cut-off timer settings may also be included, which may be adjustable at any time prior to activation.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated.

We claim:

1. A multi-function vehicle mirror control system comprising:

at least one mirror assembly having at least one first mirror and at least one second mirror, each of the first and second mirrors configured to be mounted to a same side of the vehicle, the at least one mirror assembly having at least a first motor to at least one of tilt and pan the first mirror, and at least a second motor to at least one of tilt and pan the second mirror;

a control input device having a plurality of selectable controls to select a side of a vehicle which the first and second mirrors are mounted thereto and to select one of: the at least one first mirror and the at least one second mirror, the control input device also having a plurality of directional input controls to select a direction of movement of a selected mirror, each of the plurality of directional input controls respectively corresponding to different direction of movement of a selected mirror from the first and second mirrors mounted on the same side of the vehicle, each of the different direction of movements being determined by the at least one control input device, wherein the control input device is configurable to be oriented in both landscape orientation and portrait orientation;

an orientation device for determining the orientation of the control input device; and at least one controller operatively enabled to control at least one of selection, activation, and movement of the at least one first mirror and the at least one second mirror, and wherein selection of a control of the control input device provides at least one of selection, activation, and movement information to the at least one controller, and wherein the orientation device provides the determination of the orientation of the control input device to the at least one controller, and wherein the at least one controller controls and operates the corresponding at least one of the at least one first mirror and the at least one second mirror for viewing from the same side of the vehicle, responsive to the information and the determination of the orientation received from the orientation device.

2. The multi-function vehicle mirror control system of claim 1, wherein the orientation device automatically determines the orientation responsive to an automatic orientation detection device.

3. The multi-function vehicle mirror control system of claim 1, wherein the orientation device determines the orientation responsive to activation of an orientation switch.

4. The multi-function vehicle mirror control system of claim 1, wherein selection of one of the at least one first and second mirrors must be proceeded sequentially by selection, within a predefined period of time, of at least one of: the at least one mirror assembly and another of the at least one first and second mirrors.

5. The multi-function vehicle mirror control system of claim 1, wherein the at least one directional input control transmits a directional input signal to the at least one controller, and wherein the at least one controller controls movement of a selected mirror in a single direction responsive to the directional input signal.

6. The multi-function vehicle mirror control system of claim 1, wherein the at least one directional input control transmits a directional input signal to the at least one controller, and wherein the at least one controller controls movement of a selected mirror in multiple directions responsive to the directional input signal.

7. The multi-function vehicle mirror control system of claim 1, further comprising a cutoff timer operatively connected to said at least one controller, and wherein said at least one controller activates the cutoff timer responsive to selection of the at least one mirror assembly which allows selection of at least one of the at least one first mirror and the at least one second mirror during a predefined period, and wherein said at least one controller resets the cutoff timer responsive to the selection of one of: the at least one first mirror and the at least one second mirror, which then allows selection of the at least one directional input control during the predefined period.

8. The multi-function vehicle mirror control system of claim 1, further comprising at least one of a backlight and an LED, and wherein said at least one controller activates the at least one of a backlight and an LED for a predefined period of time responsive to the selection of a control of the control input device.

9. The multi-function vehicle mirror control system of claim 1 further comprising at least one heating element located within the at least one mirror assembly to heat the at least one first and second mirrors;

wherein the at least one control input device includes a selectable control to select the at least one heating element, and wherein the at least one controller is operatively enabled to control activation and deactivation of the at least one heating element.

10. The multi-function vehicle mirror control system of claim 9, further comprising an automatic heater cutoff timer, and wherein said at least one controller activates the automatic heater cutoff timer responsive to selection of the control to activate the at least one heating element, which deactivates the at least one heating element after a predefined period of time, and wherein the at least one controller can further deactivate the at least one heating element prematurely responsive to reselecting the control for the at least one heating element before the predefined period of time has lapsed.

11. The multi-function vehicle mirror control system of claim 1, further comprising a heating element switch controlling activation of a first heating element used for the first mirror and controlling activation of a second heating element used for the second mirror.

12. The multi-function vehicle mirror control system of claim 1, further comprising a heating element switch controlling activation of a first heating element used for the first mirror comprising a rear view mirror and controlling activation of a second heating element used for the second mirror comprising a cross view mirror.

13. The multi-function vehicle mirror control system of claim 1, further comprising a heating element switch controlling activation of at least one of a first plurality of heating elements for a first plurality of mirrors installed on a same external side of a vehicle, and a second plurality of heating elements for a second plurality of mirrors installed externally on the vehicle.

14. The multi-function vehicle mirror control system of claim 1, wherein the first mirror and the second mirror are arranged in an array in the longitudinal direction on the mirror assembly when the mirror assembly is attached on a vehicle.

15. The multi-function vehicle mirror control system of claim 14, wherein the first mirror and the second mirror are arranged in the array comprising a column in the longitudinal direction on the mirror assembly wherein the first mirror is an upper mirror and the second mirror is a lower mirror below the first mirror.

16. The multi-function vehicle mirror control system of claim 1, wherein the first and second mirrors being included in one mirror assembly, the mirror assembly comprising a right mirror assembly or a left mirror assembly on the same side of the vehicle.

17. The multi-function vehicle mirror control system of claim 1, wherein said at least one mirror assembly comprises a housing and the at least one first mirror and the at least one second mirror disposed within the housing of said at least one mirror assembly, the first and second mirrors having at least one motor to at least one of tilt and pan the first and second mirrors within the housing.

18. A method of operating a multi-function vehicle mirror control system comprising: determining an orientation of the multi-function vehicle mirror control system, the multi-function vehicle mirror control system being configurable to be oriented in both landscape orientation and portrait orientation; selecting one of a plurality of controls including at least one of a first mirror control, and a second mirror control, the first mirror control configured to control at least one first mirror, the second mirror control configured to control at least one second mirror, each of the first and second mirrors configured to be mounted to a same side of the vehicle; selecting a direction of movement when one of the first and second mirrors are selected; and controlling selection, activation and movement of the first mirror and the second mirror responsive to the selecting of the one of plurality of controls, the selecting the direction and the determining the orientation of the multi-function vehicle mirror control system.

19. The method of operating a multi-function vehicle mirror control system of claim 18, wherein said determining further comprises automatically determining the orientation responsive to an automatic orientation detection device.

20. The method of operating a multi-function vehicle mirror control system of claim 18, wherein said determining further comprises determining the orientation responsive to activation of an orientation switch.

21. The method of operating a multi-function vehicle mirror control system of claim 18, further comprising transmitting the direction of movement to at least one controller, and controlling by the at least one controller movement of a selected mirror in a single direction responsive to the direction of movement.

22. The method of operating a multi-function vehicle mirror control system of claim 18, further comprising transmitting the direction of movement to at least one controller, and controlling by the at least one controller movement of a selected mirror multiple directions responsive to the directional of movement.

23. The method of operating a multi-function vehicle mirror control system of claim 18, further comprising:
    activating by at least one controller a cutoff timer responsive to selection of the at least one mirror assembly which allows selection of at least one of the at least one first mirror and the at least one second mirror during a predefined period; and
    resetting by the at least one controller the cutoff timer responsive to the selection of one of: the at least one first mirror and the at least one second mirror, which then allows selection of the at least one directional input control during the predefined period.

24. The method of operating a multi-function vehicle mirror control system of claim 18, further comprising at least one of a backlight and an LED, and wherein said at least one controller activates the at least one of a backlight and an LED for a predefined period of time responsive to the selection of a control of the control input device.

25. The method of operating a multi-function vehicle mirror control system of claim 18, further comprising selecting at least one heating element switch controlling activation of at least one heating element for heating at least one of the first and second mirrors.

26. The method of operating a multi-function vehicle mirror control system of claim 25, further comprising:
    activating by at least one controller an automatic heater cutoff timer responsive to selection of the control to activate the at least one heating element, which deactivates the at least one heating element after a predefined period of time; and
    deactivating by the at least one controller the at least one heating element prematurely responsive to reselecting the control for the at least one heating element before the predefined period of time has lapsed.

27. The method of operating a multi-function vehicle mirror control system of claim 18, further comprising selecting a heating element switch controlling activation of a first heating element used for the first mirror and controlling activation of a second heating element used for the second mirror.

28. The method of operating a multi-function vehicle mirror control system of claim 18, further comprising selecting a heating element switch controlling activation of a first heating element used for the first mirror comprising a rear view mirror and controlling activation of a second heating element used for the second mirror comprising a cross view mirror.

29. The method of operating a multi-function vehicle mirror control system of claim 18, further comprising selecting a heating element switch controlling activation of at least one of a first plurality of heating elements for a first plurality of mirrors installed on a same external side of a vehicle and a second plurality of heating elements for a second plurality of mirrors installed externally on the vehicle.

30. A method of installing a multi-function control in a vehicle, the multi-function control configured to control at least one mirror assembly having at least one first mirror and at least one second mirror, each of the first and second mirrors configured to be mounted to a same side of the vehicle, comprising: disposing the multi-function control in a location for mounting in the vehicle; detecting an orientation of the multi-function control using an orientation mechanism, wherein the multi-function control is configurable to be oriented in both landscape orientation and portrait orientation; setting the orientation responsive to said detecting thereby configuring the multi-function control to control each of the first and second mirrors configured to be mounted to the same side of the vehicle responsive to the orientation of the multi-function control; testing and verifying the orientation of the multi function control in the set position; and completing mounting the multi-function control with the orientation set responsive to said testing and verifying.

\* \* \* \* \*